United States Patent
Paramasivam et al.

(10) Patent No.: US 9,517,686 B1
(45) Date of Patent: Dec. 13, 2016

(54) TRACTION BATTERY DUAL-STAGE MOUNTING BRACKET

(71) Applicant: FORD GLOBAL TECHNOLOGIES, LLC, Dearborn, MI (US)

(72) Inventors: Saravanan Paramasivam, South Lyon, MI (US); David Moschet, Dearborn, MI (US); Amar Marpu, Canton, MI (US); Kimberley King, Northville, MI (US); Patrick Daniel Maguire, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/844,449

(22) Filed: Sep. 3, 2015

(51) Int. Cl.
  *B60K 1/00* (2006.01)
  *B60K 1/04* (2006.01)
  *B60R 16/04* (2006.01)

(52) U.S. Cl.
  CPC ........ *B60K 1/04* (2013.01); *B60R 16/04* (2013.01)

(58) Field of Classification Search
  CPC .......... B60R 16/04; B60R 25/00; B60R 19/00; B60K 1/04; B60K 1/00
  See application file for complete search history.

(56) References Cited

U.S. PATENT DOCUMENTS

| | | | | |
|---|---|---|---|---|
| 1,636,562 A * | 7/1927 | Hick | ............. | B60R 16/04 180/68.5 |
| 2,947,373 A * | 8/1960 | Wilson | ............. | B60R 16/04 180/68.5 |
| 5,543,248 A * | 8/1996 | Dougherty | ............. | H01M 2/1072 429/100 |
| 6,186,256 B1 * | 2/2001 | Dignitti | ............. | B60R 16/04 180/68.5 |
| 6,230,834 B1 * | 5/2001 | Van Hout | ............. | B60R 16/04 180/68.5 |
| 6,431,300 B1 * | 8/2002 | Iwase | ............. | B60K 1/04 180/68.5 |
| 6,827,168 B2 * | 12/2004 | Miyazaki | ............. | B60R 19/00 180/274 |
| 7,007,767 B2 * | 3/2006 | Damon | ............. | B60R 16/04 180/65.1 |
| 7,070,015 B2 | 7/2006 | Mathews et al. | | |
| 7,389,841 B2 * | 6/2008 | Boville | ............. | H01M 2/1083 180/68.5 |
| 7,921,951 B2 * | 4/2011 | Watanabe | ............. | B60K 1/04 180/68.5 |
| 8,037,960 B2 * | 10/2011 | Kiya | ............. | B60K 1/04 180/68.5 |

(Continued)

FOREIGN PATENT DOCUMENTS

| | | |
|---|---|---|
| DE | 102013015532 A1 | 5/2014 |
| DE | 102013112731 A1 | 5/2015 |

*Primary Examiner* — Hau Phan
(74) *Attorney, Agent, or Firm* — David B. Kelley; Brooks Kushman P.C.

(57) ABSTRACT

A vehicle includes a body structure and a traction battery for providing power to a powertrain. The vehicle also includes a bracket connecting the traction battery to the body structure. The bracket defines a frangible element configured to substantially restrict movement of the traction battery and sever in response to force upon the battery greater than a first threshold. The bracket also defines an extensible portion adapted to unfurl after the frangible element is severed allowing tethered displacement of the traction battery.

20 Claims, 3 Drawing Sheets

(56) References Cited

U.S. PATENT DOCUMENTS

| | | | | |
|---|---|---|---|---|
| 8,051,934 B2* | 11/2011 | Kiya | ......................... | B60K 1/04 |
| | | | | 180/274 |
| 8,056,664 B2* | 11/2011 | Laakso | .................. | B60K 13/02 |
| | | | | 180/68.1 |
| 8,122,989 B2* | 2/2012 | Burchett | ................. | B60R 16/04 |
| | | | | 180/68.5 |
| 8,276,698 B2* | 10/2012 | Guss | ......................... | B60K 1/04 |
| | | | | 180/65.1 |
| 8,336,657 B2* | 12/2012 | Dobbins | ................. | B60R 25/00 |
| | | | | 180/68.5 |
| 8,459,399 B2* | 6/2013 | Ohashi | ......................... | 180/312 |
| 8,616,319 B2* | 12/2013 | Yokoyama | ............... | B60K 1/04 |
| | | | | 180/68.5 |
| 8,863,878 B2* | 10/2014 | Shirooka | .................. | B60K 1/04 |
| | | | | 180/68.5 |
| 8,955,630 B2* | 2/2015 | Stuckey | ............. | B60H 1/00278 |
| | | | | 180/68.3 |
| 9,017,845 B2* | 4/2015 | Bender | ............... | H01M 2/1083 |
| | | | | 429/100 |
| 9,083,031 B2* | 7/2015 | Bolden | ............... | H01M 2/1077 |
| 9,120,441 B1* | 9/2015 | Stojkovic | ................. | B60R 16/04 |
| 9,153,808 B2* | 10/2015 | Bolden | .................. | B60R 16/04 |
| 2008/0196957 A1* | 8/2008 | Koike | ...................... | B60K 1/04 |
| | | | | 180/68.5 |
| 2013/0037335 A1* | 2/2013 | Sakamoto | ............ | H05K 5/0204 |
| | | | | 180/65.8 |

* cited by examiner

TRACTION BATTERY DUAL-STAGE MOUNTING BRACKET

TECHNICAL FIELD

The present disclosure relates to a mounting structure for a vehicle traction battery.

BACKGROUND

Electrified vehicles employ a traction battery to provide propulsive power to a powertrain. A traction battery may include a plurality of internal battery cells housed within a battery enclosure. Related to the size and mass of the battery assembly, a traction battery may be secured at a number of different locations on a vehicle structure. Depending on the location of the traction battery mounting, structural intrusion into the vehicle stemming from impact loads may interact with the battery structure.

SUMMARY

In at least one embodiment, a vehicle includes a body structure and a traction battery for providing power to a powertrain. The vehicle also includes a bracket connecting the traction battery to the body structure. The bracket defines a frangible element configured to substantially restrict movement of the traction battery and sever in response to force upon the battery greater than a first threshold. The bracket also defines an extensible portion adapted to unfurl after the frangible element is severed allowing tethered displacement of the traction battery.

In at least one embodiment, a traction battery mounting apparatus includes a frangible element configured to retain a traction battery to a vehicle structure. The mounting apparatus also includes a deformable portion adapted to allow tethered translation of the traction battery relative to the vehicle structure. The frangible element is configured to detach in response to a force upon the traction battery that is greater than a threshold. The deformable portion extends in length once the frangible element is detached to tether the traction battery.

In at least one embodiment, a traction battery mounting apparatus includes a first portion attached to a vehicle structure and a second portion attached to a traction battery. The mounting apparatus also includes an interconnecting portion connecting the first portion to the second portion. The interconnecting portion defines a frangible strap adapted to substantially prevent displacement of the traction battery in response to forces less than a threshold and then detach or separate in response to forces greater than the threshold.

The interconnecting portion of the traction battery mounting apparatus may also include at least one deformable strap adapted to expand in length once the frangible strap is severed.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
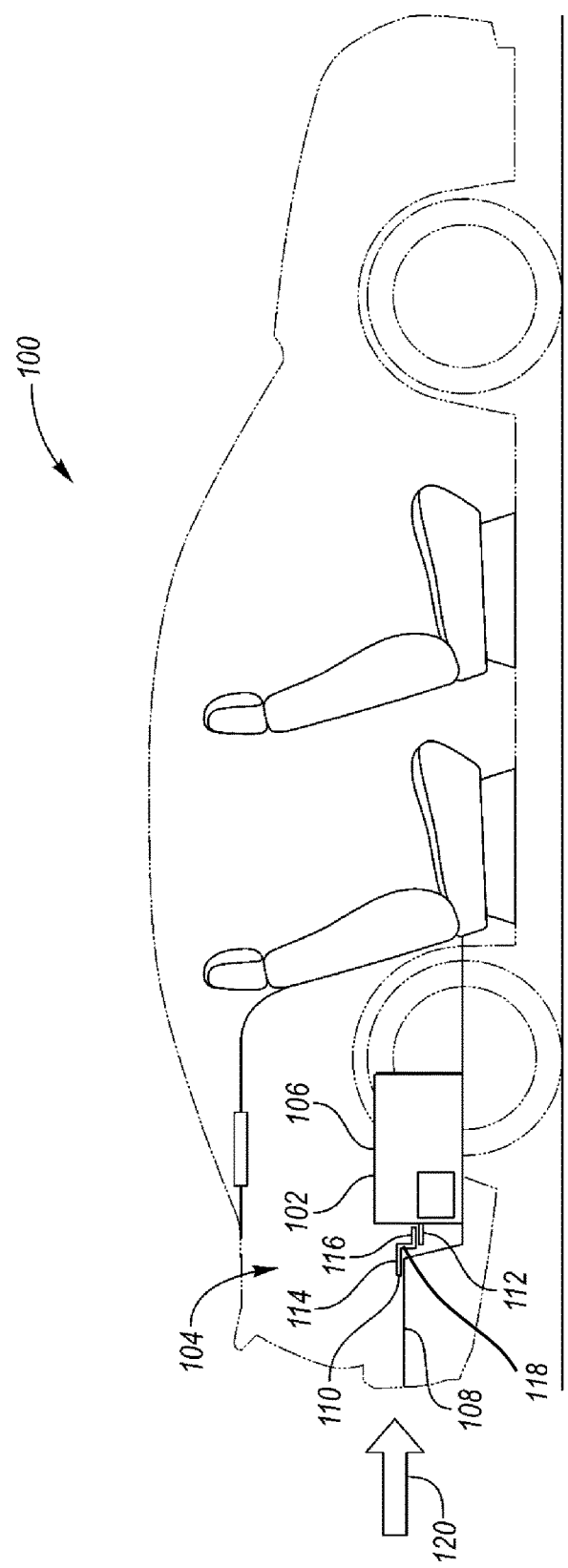
FIG. 1 is a schematic side view of a vehicle having a traction battery.

Referring to FIG. 1, a side view schematic of a vehicle 100 is depicted according to an aspect of the present disclosure. The vehicle 100 includes a high voltage traction battery 102 for providing power to a powertrain. In the example provided, the traction battery 102 is housed in a lower rear portion of the vehicle 100. More specifically, the battery 102 may be housed within a trunk compartment 104.

The traction battery 102 may include an external housing 106 to enclose a number of interconnected battery cells for storing energy and providing power to the vehicle powertrain. The number of battery cells enclosed within the housing 106 can vary based the desired power level and the types of battery cells used to store energy. In some implementations there may be several hundred battery cells combined within the traction battery. The accumulation of a high number of cells contributes to the overall size and mass of the traction battery. The location of the traction battery within the vehicle structure can be controlled by the type of securement to the vehicle structure. In at least one embodiment, the housing of the traction battery 102 is secured to a floor portion 108 of the vehicle body structure.

A mounting bracket 110 connects a flange 112 extending from the traction battery housing 106 to the floor structure 108 of the vehicle. The bracket 110 defines a first portion 114 affixed to the floor portion 108, and a second portion 116 affixed to the traction battery housing 106, and an interconnecting portion 118 between the first portion 114 and the second portion 116. In the example of FIG. 1, the interconnection portion 118 connects the first portion 114 and the second portion 116 at approximately a 90 degree angle. In this way lateral loads associated with securing the traction battery to the vehicle structure may be applied to the interconnecting portion 118.

Under normal operating conditions of the vehicle 100, the bracket 110 is configured to substantially prevent displacement of the traction battery 102. In this way, the battery 102 may be secured in place during vehicle loads encountered while driving. In the event of a vehicle impact, horizontal loads from external sources can be significantly higher compared to the loads encountered during normal vehicle operating conditions. The increase in loads can cause deformation of various portions of the vehicle structure. Intrusion into structure of the passenger cabin, engine compartment, and/or rear storage compartment is caused by the vehicle impact. Relative to intrusion into the compartment that holds the traction battery, it may be desirable to permit tethered displacement of the traction battery 102 to reduce the risk of intrusion into the battery case caused by the vehicle impact. In some instances, this can be accomplished using a separate tethering device in addition to bracket 110. In other embodiments, a tether mechanism is integrated in a single mounting bracket component.

Arrow 120 FIG. 1 generally represents a direction of an external load upon the vehicle 100 due to an impact. In the example provided a rear impact is depicted, however vehicle impact loads from various directions may be mitigated by a mounting bracket according to the present disclosure. Because the traction battery may be stored in portion of the vehicle structure such as a middle portion or forward portion, a mounting bracket according to the present disclosure can operate to mitigate external impact loads applied to each of the respective locations of a battery mounting.

In at least one embodiment the mounting bracket is configured to provide two stages of stiffness in response to a range of loads applied to the traction battery housing. During normal operating conditions, the mounting bracket is stiff enough to substantially prevent movement of the battery relative to the vehicle structure. These common loads often include vibration from driving and the bracket must be stiff enough to resist small movement which may create buzz, squeaks, or rattles. Additionally, small cyclic movements caused by road loads may degrade durability of the bracket and reduce its service life. Higher loads upon the battery case that exceed a threshold, for example during a vehicle impact, may cause the bracket to extend to allow tethered displacement of the traction battery based upon instruction into the vehicle structure.

In the example of FIG. 1 the mounting bracket 110 is shown on the rear side of the traction battery 102 where the vehicle is struck. In some cases this portion of the vehicle may become deformed in the area where the bracket is shown to be attached to the vehicle structure. In alternate configurations, the mounting bracket may secure the front portion of the traction battery to the vehicle structure in an area less likely to collapse due to vehicle impact. By securing the traction battery to the structure in a location less prone to deformation, movement of the battery relative to the body attachment point may be more predictable.

Figure 2:
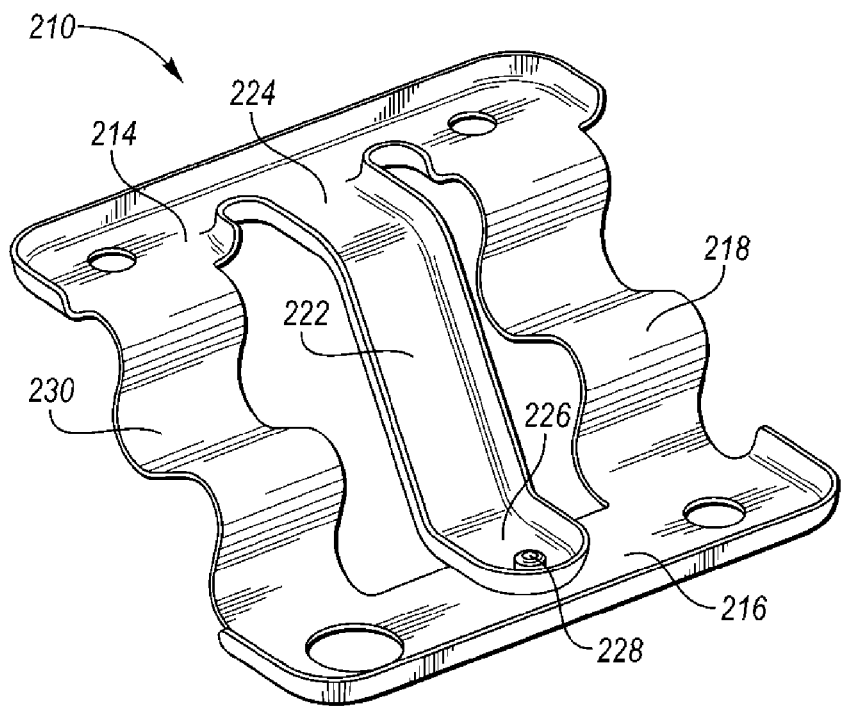
FIG. 2 is an embodiment of a traction battery mounting bracket.

FIG. 2 depicts an example of a two-stage mounting bracket 210 according to the present disclosure. Similar to the previous example, a first portion 214 is secured to a portion of the vehicle structure, and a second portion 216 is secured to the traction battery. The mounting bracket 210 also includes an interconnecting portion 218 joining the first portion 214 to the second portion 216 of the bracket. The interconnecting portion 218 includes a frangible element 222 that is configured to substantially restrict movement of the traction battery under normal operating conditions, and sever in response to force upon the battery greater than a first threshold. In the example of FIG. 2, an upper end 224 of the frangible element 222 is integrally connected to the first portion 214. By configuring the frangible element 222 to be integral to the mounting bracket 210, it is possible to form the bracket from a single stamped component reducing cost and complexity. A lower end 226 of the frangible element 222 is fastened to the second portion 216 of the mounting bracket by a fastener 228. The fastener 228 may be formed from a different material from the rest of the mounting bracket. More specifically, the fastener may be formed from a material which is softer than the remaining portions of the bracket 210. Both the diameter and material of the fastener enable tuning of the two-stage bracket such that the fastener shears at a predetermined load as part of the first stage. In at least one embodiment, the frangible element 222 of the bracket 210 is fastened to the first portion 214 or the second portion 216 with at least one rivet configured to sever in response to a force upon the battery greater than the first threshold.

In alternative embodiments, the lower end 226 of the frangible element 222 may be solidly secured to the second portion 216 via an interlocking tab, a weld, or other fixing to secure portion 216 to the traction battery at this location. In this case, the frangible element 222 may be made frangible by stamping one or more holes and/or notches to act as a stress riser that will promote failure of the frangible portions when a threshold force is exceeded.

The interconnecting portion 218 also includes at least one extensible portion 230 which also joins the first portion 214 to the second portion 216. The extensible portion 230 is configured to deform once the frangible element 222 is severed in response to loads greater than a predetermined threshold. The extensible portion 230 includes a corrugated segment having ridges and valleys such that there is excess length folded within the extensible portion 230. Extensible portion 230 may also be folded or otherwise shortened in lieu of corrugations. When sufficient loads are applied to the mounting bracket 210, the extensible portion is stretched out to allow tethered movement of the battery. As the extensible portion is unfurled, additional energy is absorbed, and intrusion into the vehicle structure housing the battery may be mitigated. The controlled movement of the battery may help to avoid damage to the internal components of the high voltage battery. In at least one embodiment the extensible portion defines a serpentine shape configured to unfurl when the deformable portion expands in length. The load profile of the extensible portion 230 may be tuned by adjusting any one of the combination of material composition, material thickness, and/or number of folds in the corrugated segment.

Figure 3:
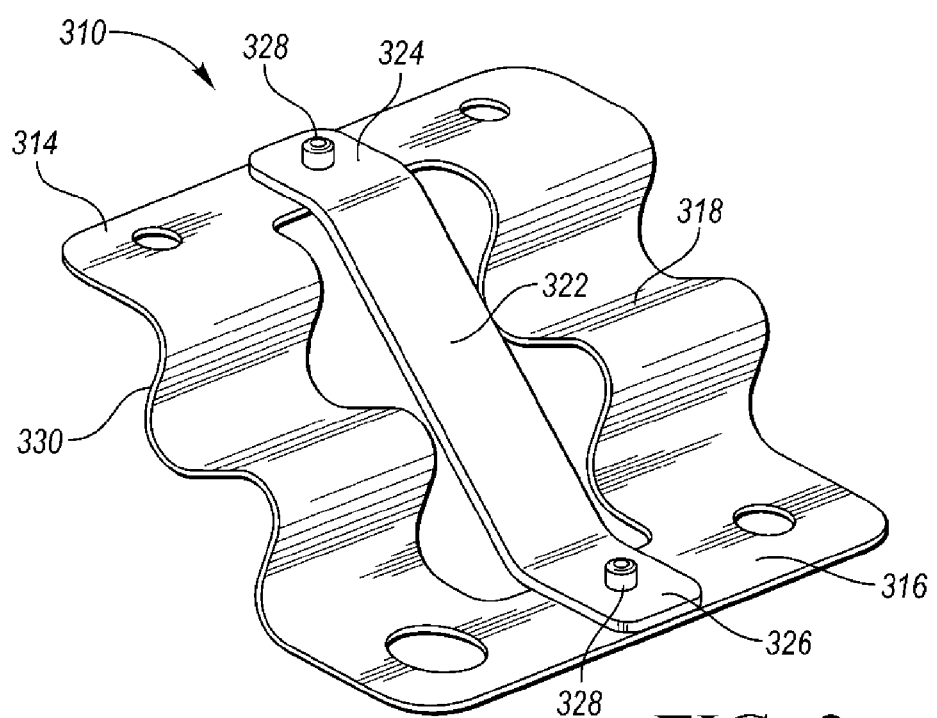
FIG. 3 is an alternate embodiment of a traction battery mounting bracket.

FIG. 3 depicts another example of a mounting bracket 310 according to an aspect of the present disclosure. Mounting bracket 310 includes a first portion 314 and a second portion for connecting to a vehicle structure and a traction battery, respectively. The mounting bracket 310 also includes an interconnecting portion 318 joining the first portion 314 to the second portion 316 of the bracket. The interconnecting portion 318 includes a frangible element 322 that is configured to substantially restrict movement of the traction battery under normal operating conditions, and detach in response to force upon the battery greater than a predetermined threshold. In the example of FIG. 3, an upper end 324 of the frangible element 322 is fastened to the first portion 314 by a fastener 328. A lower end 326 of the frangible element 322 is fastened to the second portion 316 of the mounting bracket by a fastener 328. In this case, the frangible element is not integral to either the first or second portions, but is assembled to the mounting bracket 310. By configuring the frangible element 322 as a separate component, the stiffness during each of the first stage and the second stage of loading may be further tuned as compared to an integral element as discussed above. For example, the frangible element 322 may be formed from a different material, or formed to include have more complex shapes relative to other portions. The fastener attachments 328 at the upper end 324 and lower end 326 may be the weak points intended to shear under loads exceeding a predetermined threshold. In alternate embodiments, the frangible element may be formed from a die cast material and include ribbing and other structural elements to increase stiffness when the mounting bracket is secured under normal operating conditions. The increased stiffness may be more suitable to resist vibratory loads commonly encountered while driving.

Similar to previous examples, once an attachment 328 of the frangible element 322 is separated from the mounting bracket, the loads engage the extensible portion 330. An additional benefit of forming the frangible element 322 from a different material is that the extensible portion can be formed from a material having high ductility compared to the stiffer frangible portion 322. In this way the increased deformation during the second stage may be achieved through higher deformation of the material of the extensible portion 330.

Figure 4A:
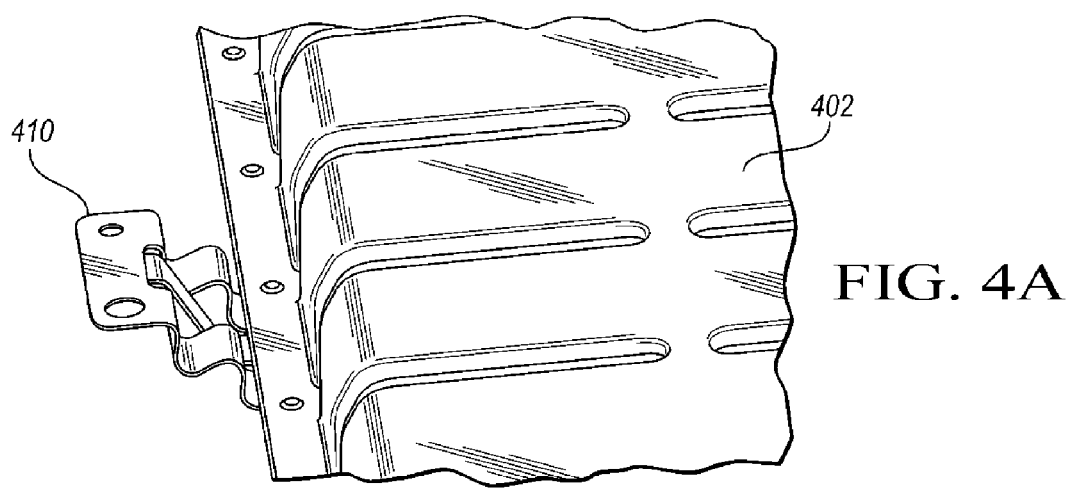
FIG. 4A is elevation view of a mounting bracket attached to a traction battery prior to deformation.
Figure 4B:
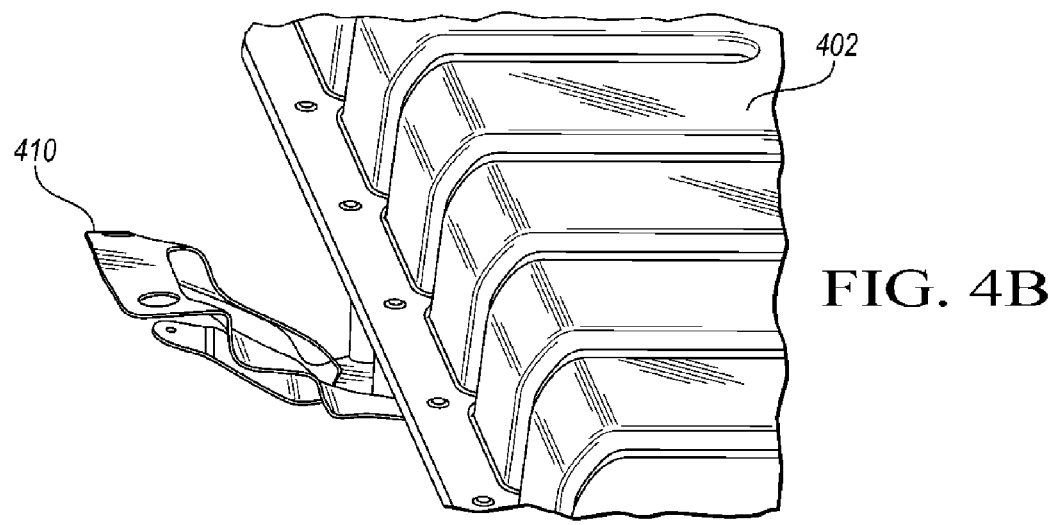
FIG. 4B is elevation view of a mounting bracket attached to a traction battery following deformation.

FIGS. 4A and 4B depict images of performance of a dual-stage bracket according to aspects of the present disclosure. FIG. 4A shows a first loading stage during normal operation of the vehicle when service loads are generally less than a predetermined force threshold. Bracket 410 secures a traction battery housing 402 to a vehicle structure (not shown). During the first stage, a frangible element of the mounting bracket 410 operates to substantially restrict movement of the traction. As discussed above, one or more failure points may be provided on the frangible element itself, or though fastening features to allow a separation in response to input loads that exceed the predetermined threshold.

As shown in FIG. 4B, the extensible portion of the mounting bracket is deformed in response to the sufficient loads upon the battery structure. The frangible element is shown detached at an upper portion of the mounting bracket. The detachment allows the extensible portions to provide tethered displacement of the traction battery. In at least one embodiment, the extensible portion of the bracket defines a linear length of about 76 mm. In the event of sufficient loads applied to the traction battery case, the extensible portions of the bracket are configured to provide an amount of length extension of about 36 mm, or about 50% increase in length from the undeformed linear length. In turn, the traction battery may be controllably displaced a corresponding distance to allow for structural intrusion into the vehicle and mitigate potential damage to the battery structure. As discussed above, the length of available extension is highly tunable based upon the number and shape of folds in the corrugated segment.

While the detachment feature is depicted at an upper portion of the mounting bracket, as discussed above the detachment feature may be provided at different locations. Further, there may be multiple detachment features on the mounting bracket allowing for separation at different locations based on the loads applied to the battery structure.

In further embodiments, the extensible portion may include a cable or other tether having a length that is slack while the frangible portion is intact. The cable may define a length that is greater than the frangible portion. In this way, the cable engages in tension to restrain movement of the battery once the frangible portion separates. The length of the cable may be sized according to a desired maximum amount of movement of the battery.

Figure 5:
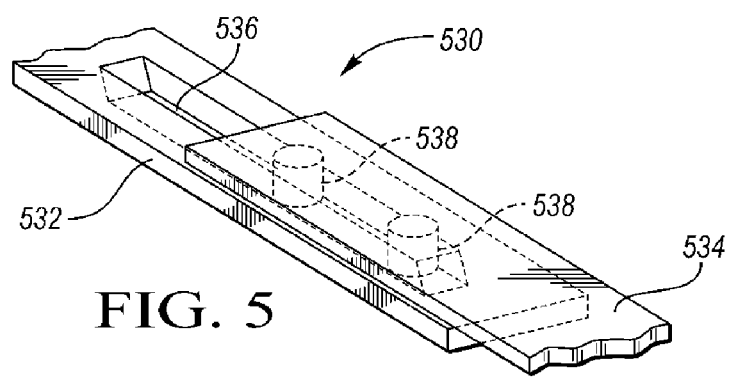
FIG. 5 is a further embodiment of a traction battery mounting bracket.

In further still embodiments, the extensible portion may include multiple pieces in sliding engagement relative to each other. Referring to FIG. 5, an extensible portion 530 of a mounting bracket is depicted which may be adapted to engage once a frangible portion (not shown) of the bracket separates similar to previous embodiments. A first portion 532 may be secured to one of either the traction battery housing or the vehicle structure. A second portion 534 is attached to the other of the traction battery housing or the vehicle structure. In one example, the first portion 532 is a fixed element attached to the vehicle structure, and the second portion 534 is a shifting element attached to the traction battery. The first portion 532 and the second portion 534 are slidable relative to one another. The first portion 532 defines an elongate slot 536 therethrough. The second portion 534 includes at least one post 538 that engages the elongate slot 536. In the example of FIG. 5, there is a pair of posts that protrudes from a surface of the second portion 534. In the case of one post, both translation and rotation of the battery relative to the vehicle may be allowed. In the case of two or more posts as shown in FIG. 5, a pair of posts may allow only translation of the battery relative to the vehicle structure. The length of the elongate slot 536 and location of the at least one post 538 are configured to achieve a desired maximum distance of tethered battery movement following separation of a frangible portion. In one embodiment, a post is formed by a rivet that retains the first portion 532 to the second portion 534 in sliding engagement.

In further additional embodiments, the sliding configuration of FIG. 5 may provide the functionality of both the frangible portion as well as the extensible portion. For example, the second portion 534 may be initially secured to both of the battery housing and the vehicle structure and include a frangible portion. In response to loads greater than a threshold, the frangible portion may detach allowing sliding movement of the second portion 534 relative to the first portion 532 along the elongate slot 536.

While the present disclosure discusses securing a traction battery with a bracket having a multi-stage load profile, a bracket according to the present disclosure may be suitable to provide tethered displacement for other components. Where controlled displacement may help mitigate component damage due to structural intrusion a bracket employing aspects of the present disclosure may be useful.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a body structure;
    a traction battery for providing power to a powertrain; and
    a bracket connecting the traction battery to the body structure, the bracket defining a frangible element configured to substantially restrict movement of the traction battery and sever in response to force upon the battery greater than a first threshold, the bracket further defining an extensible portion adapted to unfurl after the frangible element is severed allowing tethered displacement of the traction battery.

2. The vehicle of claim 1 wherein the frangible element of the bracket is fastened to a fixed portion of the bracket with at least one rivet configured to sever in response to the force upon the battery being greater than the first threshold allowing the frangible element to detach.

3. The vehicle of claim 1 wherein the frangible element of the bracket is formed from a different material from the extensible portion of the bracket.

4. The vehicle of claim 1 wherein the extensible portion of the bracket defines a serpentine shape adapted to unfurl after the frangible element is severed.

5. The vehicle of claim 1 wherein the extensible portion of the bracket allows tethered displacement of the traction battery of at least about 36 mm.

6. The vehicle of claim 1 wherein the frangible element is integrally formed with the bracket at a first end and secured to the bracket by a fastener at a second end.

7. The vehicle of claim 1 further comprising a second extensible portion, wherein the first and second extensible portions are disposed adjacent the frangible element on opposite sides of the bracket.

8. The vehicle of claim 1 further comprising a second extensible portion, wherein the frangible element is disposed between the first and second extensible portions.

9. The vehicle of claim 1 further comprising a second extensible portion, wherein the frangible element is integrally formed at a first end with a portion connecting the first and second extensible portions.

10. A traction battery mounting apparatus comprising:
a frangible element configured to retain a traction battery to a vehicle structure; and
a deformable portion adapted to allow tethered translation of the traction battery relative to the vehicle structure, wherein the frangible element severs in response to a force upon the traction battery greater than a threshold and the deformable portion extends in length once the frangible element is severed to tether the traction battery.

11. The traction battery mounting apparatus of claim 10 wherein an amount of extension of the deformable portion is proportional to an amount of intrusion into the vehicle structure resulting from a vehicle impact.

12. The traction battery mounting apparatus of claim 10 wherein the frangible element is connected to the deformable portion by at least one rivet arranged to sever in response to the force imparted upon the traction battery greater than a threshold.

13. The traction battery mounting apparatus of claim 10 wherein the deformable portion is formed from a material having a higher ductility relative to a material of the frangible element.

14. The traction battery mounting apparatus of claim 10 wherein the deformable portion includes a serpentine shape configured to unfurl when the deformable portion expands in length.

15. The traction battery mounting apparatus of claim 10 wherein the frangible element is integrally formed with the mounting apparatus at a first end and secured to the mounting apparatus by a fastener at a second end.

16. A traction battery mounting apparatus comprising:
a first portion attached to a vehicle structure;
a second portion attached to a traction battery; and
an interconnecting portion connecting the first portion to the second portion, wherein the interconnecting portion includes:
a frangible strap that severs in response to loads greater than a threshold, and
at least one extensible strap that is expandable in response to the frangible strap severing.

17. The traction battery mounting apparatus of claim 16 wherein the extensible strap comprises a shifting element in sliding connection to a fixed element wherein the shifting element is attached to the traction battery and allows tethered displacement of the traction battery in response to loads greater than the threshold.

18. The traction battery mounting apparatus of claim 16 wherein the extensible strap defines a serpentine shape adapted to unfurl when the extensible strap expands.

19. The traction battery mounting apparatus of claim 16 wherein the frangible strap is formed from a material having a greater stiffness than a material forming the extensible strap.

20. The traction battery mounting apparatus of claim 16 the frangible strap is integrally formed with the first portion at a first end and secured to the second portion by a fastener at a second end, wherein the frangible strap severs at the fastener.

* * * * *